Figure 11:
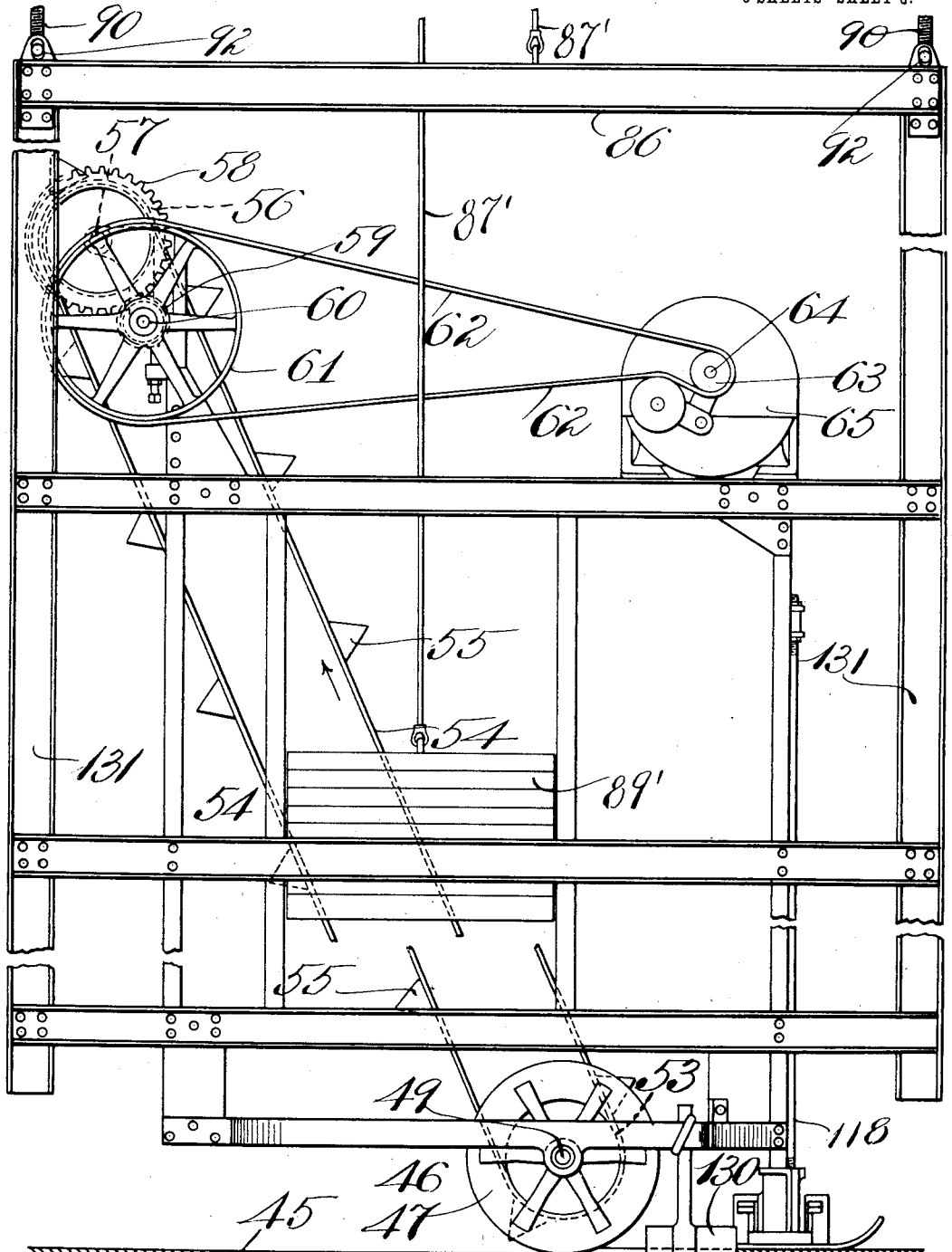

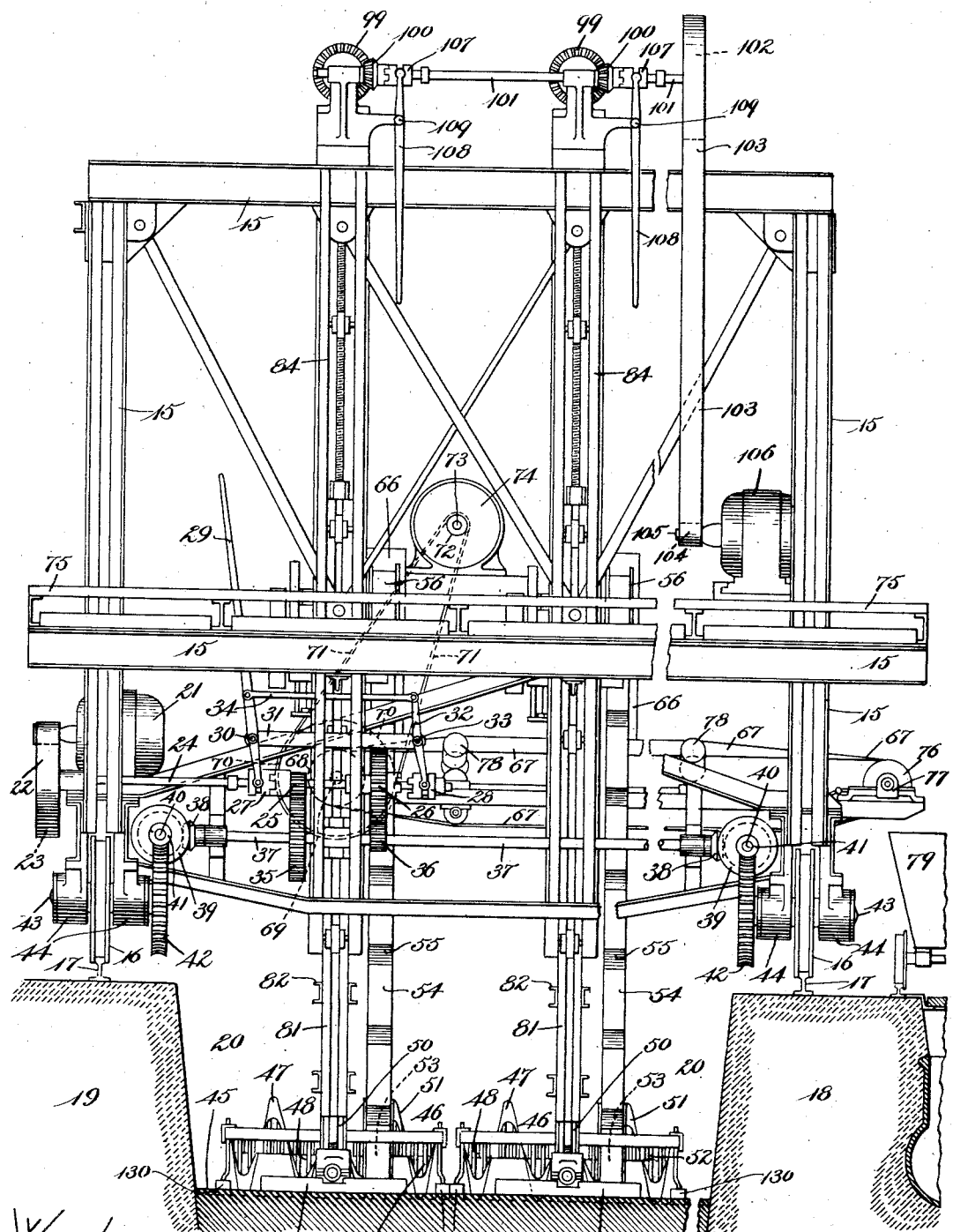

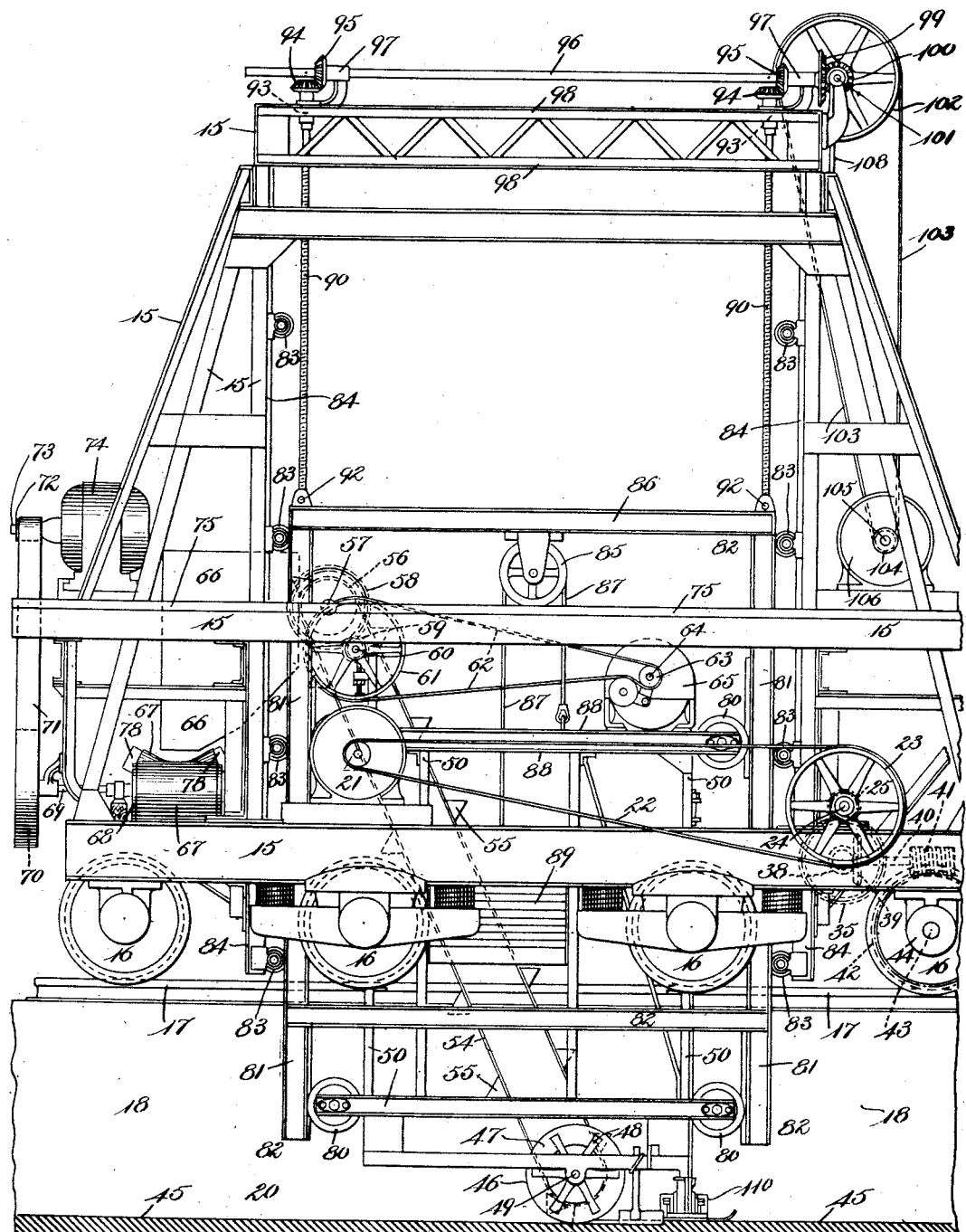

No. 763,354. PATENTED JUNE 28, 1904.
H. W. BLAISDELL.
APPARATUS FOR REMOVING MATERIAL FROM THE SURFACE OF FILTER BEDS.
APPLICATION FILED JUNE 8, 1903.
NO MODEL. 6 SHEETS—SHEET 3.
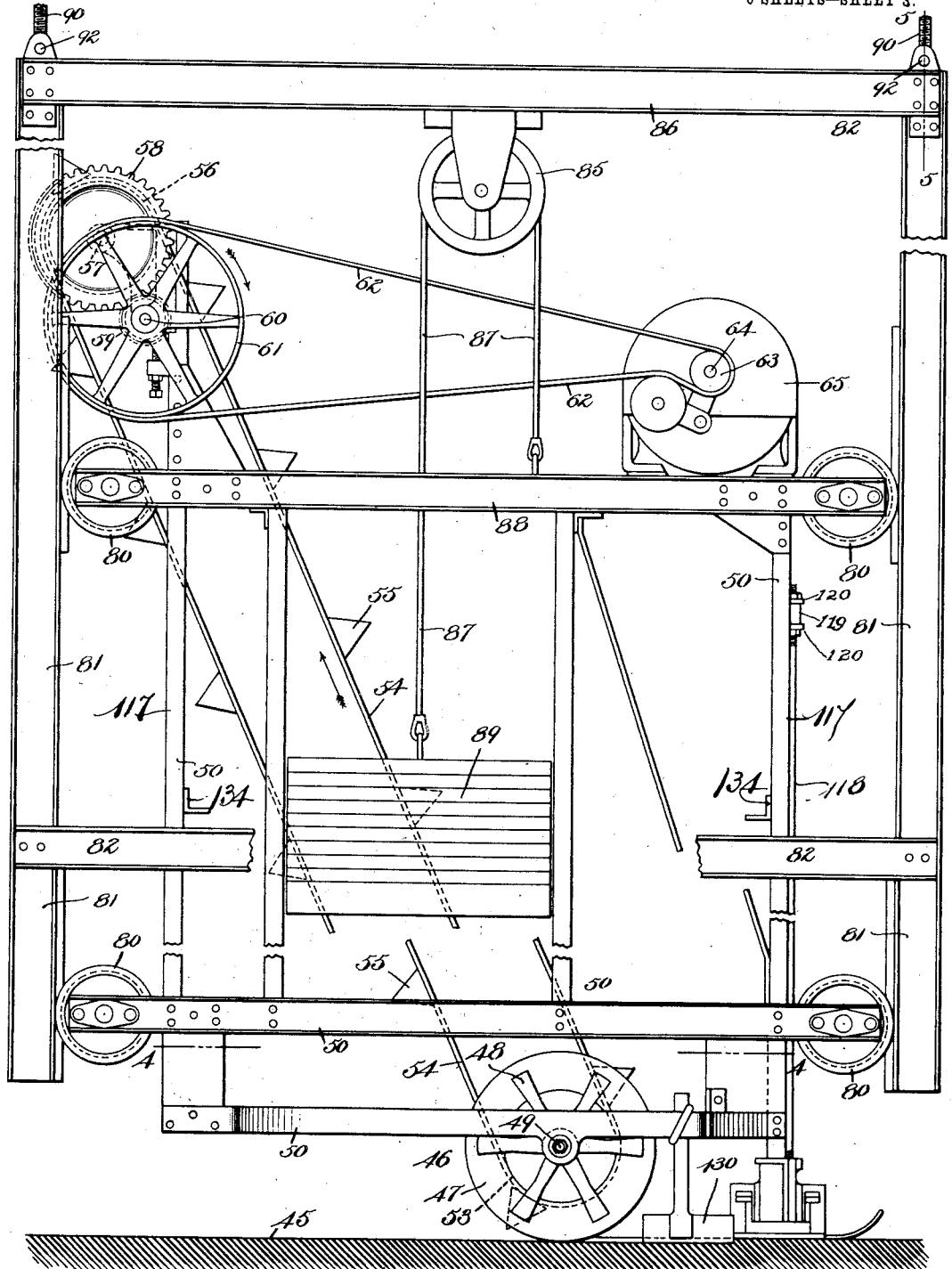
FIG-3-
WITNESSES:
Franklin E. Low.
Louis A. Jones.
INVENTOR:
Hiram W. Blaisdell
by his Attorney, Charles L. Goodings.

No. 763,354. PATENTED JUNE 28, 1904.
H. W. BLAISDELL.
APPARATUS FOR REMOVING MATERIAL FROM THE SURFACE OF FILTER BEDS.
APPLICATION FILED JUNE 8, 1903.
NO MODEL. 6 SHEETS—SHEET 4.
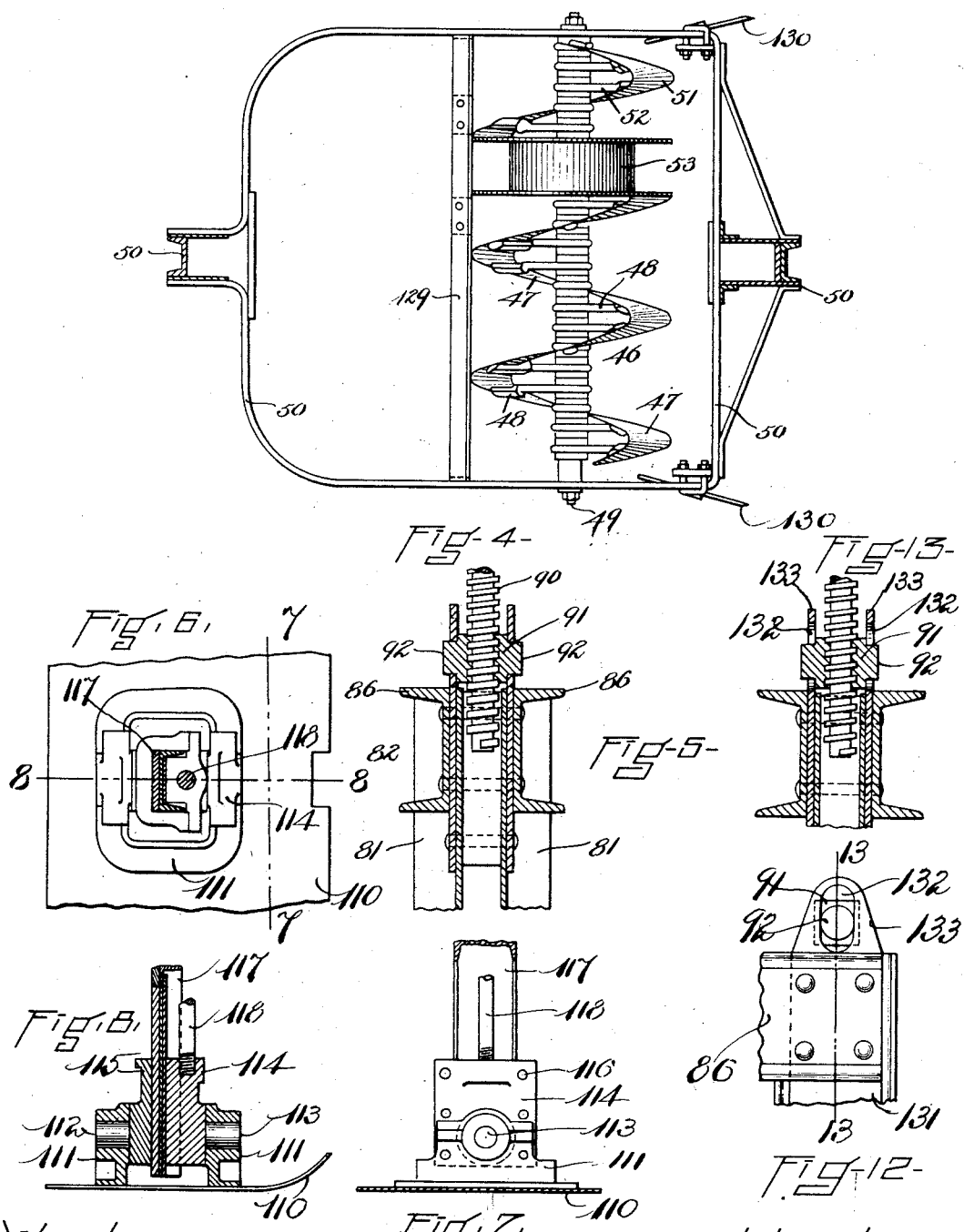
WITNESSES:
Franklin E. Low
Louis A. Jones
INVENTOR:
Hiram W. Blaisdell,
by his Attorney,
Charles N. Gooding.

No. 763,354. PATENTED JUNE 28, 1904.
H. W. BLAISDELL.
APPARATUS FOR REMOVING MATERIAL FROM THE SURFACE OF FILTER BEDS.
APPLICATION FILED JUNE 8, 1903.
NO MODEL. 6 SHEETS—SHEET 5.
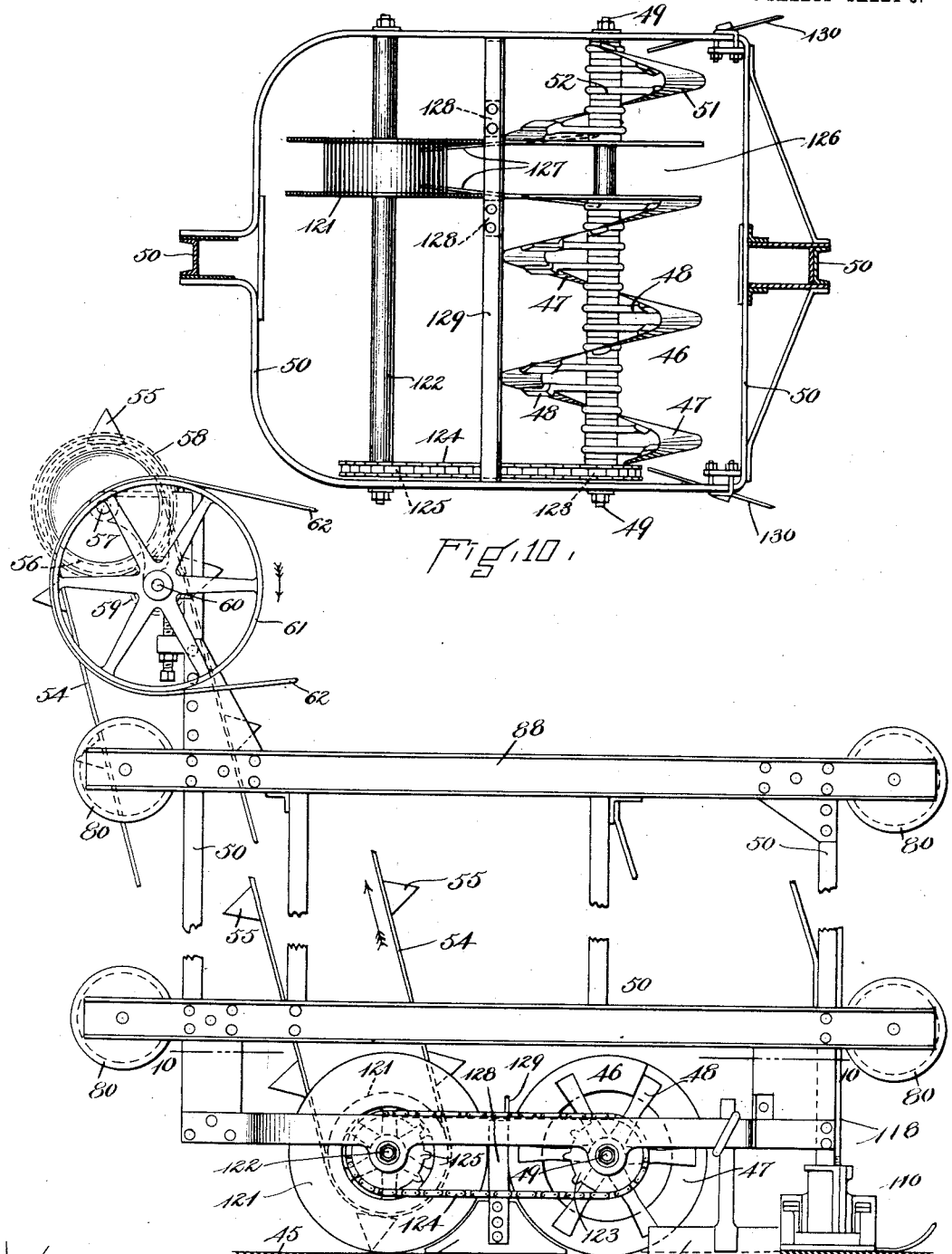

No. 763,354. Patented June 28, 1904.

UNITED STATES PATENT OFFICE.

HIRAM W. BLAISDELL, OF LOS ANGELES, CALIFORNIA.

APPARATUS FOR REMOVING MATERIAL FROM THE SURFACE OF FILTER-BEDS.

SPECIFICATION forming part of Letters Patent No. 763,354, dated June 28, 1904.

Application filed June 8, 1903. Serial No. 160,637. (No model.)

*To all whom it may concern:*

Be it known that I, HIRAM W. BLAISDELL, a citizen of the United States, residing at Los Angeles, in the county of Los Angeles and State of California, have invented new and useful Improvements in Apparatus for Removing Material from the Surface of Filter-Beds, of which the following is a specification.

This invention relates to an improved apparatus for removing sand from the surface of sand filter-beds used in purifying the supply of water to cities and towns. These filters are of various kinds and are usually laid out in a series of beds made of sand and inclosed by walls running longitudinally and transversely thereof. The water is introduced into the basin formed by the said walls and filters and passes through the sand forming the upper layers of the filter-beds, thus leaving upon the surface of the sand the impurities previously contained in the water-supply. These impurities in time form a film or crust upon the upper surface of the sand, and the sand near the upper surface becomes covered with impurities, which interferes with the efficiency of the filter-bed, and it becomes necessary to remove this film or crust and the sand upon the surface of the bed. It is desirable in removing the sand from the surface of the filter-beds to remove the same to a certain depth, leaving a smooth even surface. The filter-beds are of large area, and to remove the sand, as hereinbefore set forth, from the surface of the beds without the aid of machinery or mechanical apparatus involves an enormous amount of labor and expense; and it is therefore the object of this invention to provide an apparatus which will remove the sand from the surface of the sand filter-beds to a certain depth, leaving an even and clean surface of sand.

It is the further object of this invention to provide a simple and durable machine for the purpose hereinbefore set forth and to provide a machine which shall be adapted to follow the inequalities of the surface of the filter-bed and remove the sand therefrom to an equal depth throughout the entire surface of said filter-bed.

The invention consists, in an apparatus of the character described, of a carriage arranged and adapted to travel over the surface of said filter-beds, a conveyer located upon said carriage, mechanism to scrape the sand from the surface of said filter-beds, and an elevator to carry said sand from said scraper to said conveyer.

The invention again consists of an apparatus of the character described comprising in its construction a rotary helical scraper adapted to remove sand from the surface of said filter-beds.

The invention again consists, in an apparatus of the character described, of a carriage arranged and adapted to travel over the surface of said filter-beds, a carrier-frame arranged to slide vertically upon said carriage, an auxiliary carrier-frame arranged to slide vertically upon said carrier-frame, and a scraper supported upon said auxiliary carrier-frame.

The invention again consists in the instrumentalities hereinbefore set forth, in combination with a gage-shoe fast to the auxiliary carrier-frame, which regulates the amount or thickness of material removed from the surface of the sand filter-bed.

The invention again consists in improved mechanism for transferring the sand after it has been scraped from the surface of the bed by said scraper to dump-cars or other means of conveying the same away from said filter-beds.

The invention finally consists in the combination and arrangement of parts set forth in the following specification and particularly pointed out in the claims thereof.

Referring to the drawings, Figure 1 is a front elevation of my improved apparatus for removing sand from the surface of sand filter-beds, showing the same in position with relation to a transverse section of a filter-bed, said apparatus being partly broken away to save space in the drawings. Fig. 2 is a side elevation of my improved apparatus shown in connection with a portion of a sand filter-bed, said sand filter-bed being shown in longitudinal section and the apparatus partly broken away to save space in the drawings. Fig. 3 is a detail side elevation of the carrier-frame, auxiliary carrier-frame, scraper, and elevator-belt-driving mechanism shown in connection with a portion of a sand filter-bed. Fig. 4 is a detail horizontal section taken on line 4 4 of Fig. 3. Fig. 5 is an enlarged detail section on line 5 5 of Fig. 3. Fig. 6 is an enlarged plan view of the gage-shoe, a portion of the auxiliary carrier-frame being shown in section therein. Fig. 7 is a sectional elevation taken on line 7 7 of Fig. 6 looking toward the left in said figure. Fig. 8 is a section on line 8 8 of Fig. 6. Fig. 9 is a side elevation similar to Fig. 3, illustrating a modified arrangement of scraper and conveyer belt, the same being broken away to save space in the drawings. Fig. 10 is a horizontal detail section taken on line 10 10 of Fig. 9. Fig. 11 is a detail side elevation similar to Fig. 3 of a carrier-frame with the scraper, elevator-belt, and driving mechanism supported directly upon said carrier-frame. Fig. 12 is a side elevation of a portion of the carrier-frame and a modified means of connecting the screw-threaded block thereto, and Fig. 13 is a section taken on line 13 13, Fig. 12.

Like numerals refer to like parts throughout the several views of the drawings.

In the drawings, 15 is a carriage formed of steel beams, trusses, ties, and stay-rods and provided with wheels 16, arranged to run upon tracks 17, said tracks being located upon opposite banks 18 19 of the filter-bed 20. The carriage 15 is propelled along the tracks 17 by an electric motor 21, operatively connected by a belt 22 to a pulley 23. The pulley 23 is fast to a shaft 24, journaled in bearings upon the carriage 15. Two spur-gears 25 and 26 rotate freely upon the shaft 24 and are locked to said shaft by clutches 27 and 28, respectively, said clutches being splined to the shaft 24. The clutch 27 is moved longitudinally of the shaft 24 by means of a lever 29, pivoted at 30 to a bracket 31, fast to the carriage 15. The clutch 28 is moved longitudinally of the shaft 24 and into and out of connection with the gear 26 by a lever 32, pivoted at 33 to the bracket 31 and actuated by a link 34, pivotally connected to the lever 29. The gear 25 meshes into a gear 35, and the gear 26 meshes into a gear 36, said gears 35 and 36 being fast to shaft 37, arranged to rotate in bearings upon the carriage 15. The relative diameters of the gears 25 and 35 and 26 and 36 are so proportioned that when the clutch 27 is thrown into engagement with the gear 25 the shaft 37 will be rotated at a speed comparatively much slower than that at which it is rotated when the clutch 28 is thrown into engagement with the gear 26 and the shaft 37 is rotated by the gears 26 and 36.

At the opposite ends of the shaft 37 are fastened bevel-gears 38, which mesh into bevel-gears 39, fast to shafts 40, said shafts 40 having fastened thereto worms 41, which engage worm-gears 42, fast to shafts 43. The shafts 43 are journaled to rotate in journal-boxes 44, fast to the carriage 15, and have fastened to them two of the wheels 16 upon which the carriage 15 is supported. It will thus be seen that the carriage 15 is propelled either at a slow or fast speed by means of the motor 21 through the belt 22, pulley 23, shaft 24, gears 25 and 35, (or 26 and 36, as the case may be,) shaft 37, bevel-gears 38 and 39, and worm-gearing 41 and 42.

The sand is removed from the surface 45 of the filter-bed by a rotary helical scraper 46. The rotary helical scraper 46 consists of a sheet-metal blade 47, bent to form a right-hand helix and fastened to arms 48, said arms being fastened to a rotary shaft 49, journaled to rotate in bearings formed in an auxiliary carrier-frame 50, and, further, said rotary helical scraper consists of a left-handed helical scraper-blade 51, fast to said shaft 49 by arms 52. Between the adjacent ends of the right-hand scraper-blade 47 and the left-hand scraper-blade 51 is a pulley 53, fast to the shaft 49. An elevator-belt 54, provided with buckets 55, passes around the pulley 53 and thence around a driving-pulley 56, fast to a shaft 57, journaled upon the auxiliary carrier-frame 50. The shaft 57 has a gear 58 fast thereto, which meshes into a pinion 59, fast to a shaft 60, journaled upon the auxiliary carrier-frame 50. The shaft 60 has a pulley 61 fast thereto, driven by a belt 62, said belt being driven by a pulley 63, fast to the motor-shaft 64 of the electric motor 65, Fig. 2. The sand from the surface 45 of the filter-bed is carried by the right and left hand helical scraper-blades 47 and 51, respectively, to the elevator-belt 54, whence it is carried by said elevator-belt, by means of the buckets 55, upwardly over the pulley 56 and emptied into the chute 66, Fig. 2. The material passes down the chute 66 and is discharged upon a conveyer-belt 67. The conveyer-belt 67 is driven by a pulley 68, fast to a shaft 69, journaled in bearings upon the carriage 15. Said shaft 69 is driven by a pulley 70 fast thereto, to which rotary motion is imparted by a belt 71, which in turn is driven by a pulley 72, fast to the driving-shaft 73 of an electric motor 74, said electric motor being supported upon a platform 75 upon the carriage 15, Figs. 1 and 2. It is evident that an endless chain with buckets attached thereto may be used in lieu of an endless belt. The conveyer-belt 67 passes from the pulley 68 around an idler-pulley 76, journaled in boxes 77, adjustably fastened to the carriage 15. Said conveyer-belt is guided to assume a V shape in cross-section midway between the pulleys 68 and 76 by idler-pulleys 78 78. It will thus be seen and understood that the material scraped from the surface 45 of the filter-bed by the rotary scraper-blades is conveyed by the buckets 55 upon the elevator-belt 54 upwardly and dumped into the chute 66, by which chute it is guided to the conveyer-belt 67 and transferred by said conveyer-belt over the pulley 76, whence it falls into a dump-car 79 and is then carried by said dump-car to any point desired. It is evident that, if so desired, the pulley 68 may be located at the extreme left-hand side of the carriage 15 and the conveyer-belt 67 run with the upper side moving toward the left by reversing the electric motor 74, and the material scraped from the surface of the filter-bed will then be dumped at the left of the carriage 15, Fig. 1, instead of at the right, as hereinbefore described.

The auxiliary carrier-frame 50 is provided with guide-wheels 80, arranged to rotate with their peripheries in contact with the inner faces of the upright beams 81 81 of a carrier-frame 82. The carrier-frame 82 is guided by wheels 83 83, journaled upon the uprights 84 of the carriage 15. The said carrier-frame 82 is provided with a pulley 85, journaled upon the upper cross-beam 86 of said carrier-frame, and over this pulley runs a wire cable 87, connected at one end to the upper cross-beam 88 of the auxiliary carrier-frame 50, and at the other end said cable is fast to a counterweight 89 of sufficient weight to very nearly counterbalance the weight of the auxiliary carrier-frame and the parts directly supported thereon.

The carrier-frame 82 is raised and lowered by means of vertical screws 90 90, which engage at their lower ends with screw-threaded blocks 91, pivoted at 92 to the carrier-frame 82, Fig. 5. At the upper ends thereof each of said screws 90 rotates in a bearing 93, provided in the carriage 15, and has fast thereto a bevel-gear 94, which meshes into a bevel-gear 95, fast to a horizontal shaft 96, journaled in bearings 97 97, fast to the upper cross-beam 98 of the carriage 15. The shaft 96 is rotated by a bevel-gear 99, fast thereto, and meshing into a bevel-gear 100, fast to a shaft 101, journaled in bearings upon the carriage 15 and rotated by a pulley 102, fast to said shaft 101, in its turn rotated by a belt 103, which is driven by a pulley 104, fast to the driving-shaft 105 of an electric motor 106, said electric motor being supported upon the carriage 15. The bevel-gear 100 is locked to the shaft 101 by a clutch 107, which is moved lengthwise of the shaft 101 into and out of contact with said gear by means of a lever 108, pivoted at 109 to the carriage 15.

The depth to which the helical scraper-blades 47 and 51 project below the surface of the filter-bed is regulated by a gage-shoe 110, adjustably fastened to the auxiliary carrier-frame 50. The gage-shoe 110 is rigidly fastened to two journal cap-blocks 111 111, Figs. 6, 7, and 8. Said cap-blocks are arranged to rock upon journals 112 113, being fastened to a cap 114, fast to a slide 115. The cap 114 is fastened to the slide 115 by bolts 116 116, and said cap and slide are formed to engage and slide upon the vertical side piece 117 of the auxiliary carrier-frame 50. An adjusting-rod 118 has screw-threaded engagement at its lower end with the cap 114 and is adjusted vertically by means of a nut 119, having screw-threaded engagement therewith at its upper end, said nut being located between two ears 120 120, fast to the vertical side piece 117. After the rod has been rotated until the shoe has been raised or lowered to the required location with relation to the periphery of the helical scraper-blades and the surface of the sand filter-bed said rod is locked in position by means of set-nuts, as shown. It will be seen that by loosening the set-nuts above and below the ears 120 and rotating the nut 119 the adjusting-rod 118 will raise or lower, as the case may be, the slide 115 and cap 114, together with the gage-shoe 110, and thus the location of said shoe will be varied with relation to the periphery of the rotary helical scraper 46.

The auxiliary carrier-frame 50 has fast to the vertical side pieces 117 angle-irons 134, which are engaged by the lower horizontal cross-piece upon the carrier-frame 82 when said carrier-frame is raised by means of the screws 90 90, and upon further rotation of said screws the carrier-frame, together with the auxiliary carrier-frame, will move upwardly together. Upon a reverse movement of the screws and after the shoe 110 has come to a bearing upon the surface of the filter-bed further movement of the screws will cause the carrier-frame to descend until the lower horizontal cross-piece thereon becomes disengaged from the angle-irons 134, and said auxiliary carrier-frame will then be free to move upwardly and downwardly to accommodate itself to the varying surface of the filter-bed as the shoe 110 travels thereover.

In the drawings, Fig. 1, I have shown two carrier-frames and two auxiliary carrier-frames, together with the scraping, elevating, and conveying mechanism hereinbefore described upon each of said auxiliary carrier-frames. By using a sufficient number of carrier-frames and the mechanism hereinbefore described supported thereon a layer of sand from the entire surface of a filter-bed may be removed by the mechanism hereinbefore described while traveling once lengthwise of said filter-bed. It will be understood that the carrier-frame, auxiliary carrier-frame, elevator-belt, and helical scrapers are duplicated for each set of scraping mechanisms, but that a single conveyer-belt receives material from all the different sets of scraping mechanisms. It will be seen that the screws 90 90 raise and lower the carrier-frames 82 when it is desired to raise or lower the scraping mechanism to any considerable extent—such as, for instance, in passing from one filter-bed to another, where it is desired to raise the scraping mechanism above the top of the walls inclosing said filter-bed; but for all slight variations in height the auxiliary carrier-frame 50 will be raised and lowered, together with the scraping mechanism carried thereon, by the gage-shoe 110 as it travels upon the surface of the filter-bed, and any inequalities or undulations in the surface of the filter-bed will be compensated for by said auxiliary carrier-frame being raised and lowered by said adjustable gage-shoe 110 as it travels over and rests upon the surface of the bed.

The general operation of the mechanism hereinbefore specifically described is as follows: Assuming the carriage 15 to be at one end of a filter-bed, the carrier-frame 82, together with the auxiliary frame and mechanism thereon, is lowered by means of the screws 90 90, operated by the mechanism hereinbefore described from the motor 106 until the gage-shoe 110 rests upon the surface of the filter-bed. The depth of cut which it is desired to take from the surface of the filter-bed is adjusted, as hereinbefore described, by the relative location of the gage-shoe 110 to the helical scraper 46. The carriage is next propelled lengthwise of the filter-bed by the electric motor 21 and mechanism connecting said electric motor, hereinbefore described, to the wheels 16 and shafts 43. Simultaneously with the commencement of the forward motion of said carriage the scrapers 46 are rotated by means of the electric motor 65 through the belt 62 and elevator-belt 54, the sand removed from the surface of the filter-bed by the helical scrapers being carried by the elevator-belt 54 and buckets 55 upwardly and dumped into the chutes 66, whence the material is conveyed to the conveyer-belt 67, said conveyer-belt carrying the material dumped upon it, as hereinbefore described, over the pulley 76 and dumping the material into the dump-car 79, the conveyer-belt being driven by the motor 74.

In Figs. 9 and 10 a modified form of scraping mechanism is illustrated in which a pulley 121 is fastened to a shaft 122, said pulley being rotated by the elevator-belt 54. The rotary scraper 46 is rotated by a sprocket-gear 123, fast to the shaft 49 and rotated by a sprocket-chain 124, said sprocket-chain being driven by a sprocket-gear 125, fast to the shaft 122. A space 126 is left between the adjacent ends of the right and left hand scraper-blades, and the material scraped into said space by said scraper-blades is guided by guide-plates 127 127 to the elevator-belt 54. The guide-plates 127 are supported upon brackets 128, fast to the cross-beam 129, said cross-beam being fastened to the auxiliary carrier-frame 50.

In both of the forms of scraping apparatus hereinbefore described stationary scraping-blades 130 are provided fastened to the auxiliary carrier-frame 50, said scraping-blades assisting the rotary scrapers by plowing furrows in advance thereof upon each side of the auxiliary carrier-frame.

While I prefer to employ in my improved apparatus for scraping sand filters a carrier-frame arranged to slide vertically upon a carriage adapted to travel over the surface of said filter-beds and in addition to employ an auxiliary carrier-frame adapted to slide upon said carrier-frame, with means to positively raise and lower said carrier-frame, as hereinbefore described, and illustrated in the drawings, Figs. 1 to 10, inclusive, it is evident that the rotary helical scraper and the mechanism by which it is driven, together with the conveyer-belt and the adjustable shoe, which regulates the depth of cut of said helical scraper below the surface of the filter-bed, may be supported directly upon a carrier-frame and the auxiliary carrier-frame omitted from the apparatus, and in Fig. 11 I have illustrated such a construction, in which the carrier-frame 131 is constructed by combining the auxiliary carrier-frame 50 and the carrier-frame 82 by extending the upper and lower cross-beams of the auxiliary carrier-frame and fastening them rigidly to the upright beams 81 81 of said carrier-frame 82. The counterweight 89' is fastened to a cable 87', which extends over a pulley (not shown) journaled upon the carriage 15 and is fastened at one end to the upper cross-beam 86 of the carrier-frame 131. The carrier-frame 131 is raised and lowered by means of the vertical screws 90 90, as in the form hereinbefore described. The gage-shoe, rotary helical scraper, conveyer-belt, and the mechanism by which said conveyer-belt is driven are the same in the form of device illustrated in Fig. 11 as in the form hereinbefore described, and illustrated in Figs. 1 to 10, inclusive, and therefore no detailed description of the same is necessary.

When the auxiliary carrier-frame and the carrier-frame are combined in one, as hereinbefore described and illustrated in Fig. 11, it is necessary that there should be freedom for the carrier-frame 131 to rise and fall according to the undulating surface of the filter-bed as the carriage is propelled thereover. If the screws 90 were to engage in this form a screw-threaded block 91, pivoted to the carrier-frame at 92, as hereinbefore described, it is evident that no variation in height could be obtained for said carrier-frame 131 as the shoe traveled over the undulating surface of the filter-bed, and in order to obtain this result the pivots 92 of the screw-threaded block 91 extend into slots 132 132, provided in ears 133, fast to the upper cross-beam 86, so that after the shoe 110 comes to a bearing upon the surface of the filter-bed a continued rotation of the vertical screws 90 will cause the blocks 91 to move downwardly until the pivots 92 of said blocks become disengaged from the upper ends of the slots 132 132. It will then be evident that the carrier-frame 131 will be free to move upwardly and downwardly as the shoe passes over the undulating surface of the filter-bed, the pivots 92 projecting into the slots 132, and thus allowing this freedom of movement to the carrier-frame 131.

While I have described my device as used for cleaning the surface of sand filter-beds, it is evident that the same may be used for cleaning filter-beds of other material than sand and also that the same mechanism may be used for removing material from receptacles of various kinds without departing from the spirit of my invention.

Having thus described my invention, what I claim, and desire by Letters Patent to secure, is—

1. In an apparatus for removing material from the surface of filter-beds, a carriage arranged to travel longitudinally of said filter-beds, a conveyer, mechanism to operate said conveyer, and an endless bucket elevator attached thereto constructed to carry the material from the surface of said filter-beds to said conveyer.

2. In an apparatus for removing material from the surface of filter-beds, a carriage arranged to travel longitudinally of said filter-beds, a conveyer, mechanism to move said conveyer transversely of said carriage, a scraper adapted to remove material from the surface of said filter-beds, and an elevator to carry said material from said scraper to said conveyer.

3. In an apparatus for removing material from the surface of filter-beds, a carriage arranged to travel over the surface of said filter-beds, a conveyer located upon said carriage, mechanism to scrape the material from the surface of said filter-beds, and an endless bucket elevator attached thereto constructed to carry the material from said scraper to said conveyer.

4. In an apparatus for removing material from the surface of filter-beds, a carriage arranged to travel longitudinally of said filter-beds, a conveyer, mechanism to operate said conveyer, an endless bucket elevator attached thereto constructed to carry the material from the surface of said filter-beds to said conveyer.

5. An apparatus of the character described comprising in its construction a carriage, a carrier-frame arranged to slide vertically upon said carriage, a rotary helical scraper journaled upon said carrier-frame, and a gage-shoe fast to said carrier-frame.

6. In an apparatus for removing material from the surface of filter-beds, a carriage arranged to travel over the surface of said filter-beds, a carrier-frame arranged to slide vertically upon said carriage, a scraper supported upon said carrier-frame, and a gage-shoe fast to said carrier-frame.

7. In an apparatus for removing material from the surface of filter-beds, a carriage arranged to travel over the surface of said filter-beds, a carrier-frame arranged to slide vertically upon said carriage, a scraper supported upon said carrier-frame, a gage-shoe fast to said carrier-frame, and means to adjust said shoe vertically with relation to said scraper.

8. In an apparatus for removing material from the surface of filter-beds, a carriage arranged to travel over the surface of said filter-beds, a carrier-frame arranged to slide vertically upon said carriage, a scraper supported upon said carrier-frame, and a gage-shoe pivotally supported upon said carrier-frame.

9. In an apparatus for removing material from the surface of filter-beds, a carriage arranged to travel over the surface of said filter-beds, a carrier-frame arranged to slide vertically upon said carriage, a scraper supported upon said carrier-frame, an elevator, mechanism to operate said elevator supported upon said carrier-frame, a conveyer, and operative mechanism therefor supported upon said carriage.

10. In an apparatus for removing material from the surface of filter-beds, a carriage arranged to travel over the surface of said filter-beds, a carrier-frame arranged to slide vertically upon said carriage, a scraper supported upon said carrier-frame, an elevator, mechanism to operate said elevator supported upon said carrier-frame, a conveyer, operative mechanism therefor supported upon said carriage, and means to guide material from said elevator to said conveyer.

11. In an apparatus for removing material from the surface of filter-beds, a carriage arranged to travel over the surface of said filter-beds, a carrier-frame arranged to slide vertically upon said carriage, and a rotary helical scraper journaled upon said carrier-frame.

12. In an apparatus for removing material from the surface of filter-beds, a carriage arranged to travel over the surface of said filter-beds, a carrier-frame arranged to slide vertically upon said carriage, a rotary helical scraper journaled upon said carrier-frame, an elevator provided with buckets, and mechanism to drive said elevator supported upon said carrier-frame.

13. In an apparatus for removing material from the surface of filter-beds, a carriage arranged to travel over the surface of said filter-beds, a carrier-frame arranged to slide vertically upon said carriage, a rotatory shaft journaled upon said carrier-frame, right and left hand helical scraper-blades fast to said shaft, and a pulley fast to said shaft between the adjacent ends of said helical scraper-blades.

14. In an apparatus for removing material from the surface of filter-beds, a carriage arranged to travel over the surface of said filter-beds, a carrier-frame arranged to slide vertically upon said carriage, a rotatory shaft journaled upon said carrier-frame, right and left hand helical scraper-blades fast to said shaft, a pulley fast to said shaft between the adjacent ends of said helical scraper-blades, an elevator engaging said pulley, and mechanism supported upon said carrier-frame to drive said elevator.

15. In an apparatus for removing material from the surface of filter-beds, a carriage, mechanism to move said carriage over the surface of said filter-beds, a carrier-frame, mechanism to raise and lower said carrier-frame upon said carriage, a rotary helical scraper journaled upon said carrier-frame, an elevator, and mechanism to operate said elevator supported upon said carrier-frame, together with a conveyer and operative mechanism therefor supported upon said carriage.

16. In an apparatus for removing material from the surface of filter-beds, a carriage arranged to travel over the surface of said filter-beds, a carrier-frame arranged to slide vertically upon said carriage, an auxiliary carrier-frame arranged to slide vertically upon said carrier-frame, and a scraper supported upon said auxiliary carrier-frame.

17. In an apparatus for removing material from the surface of filter-beds, a carriage arranged to travel over the surface of said filter-beds, a carrier-frame arranged to slide vertically upon said carriage, an auxiliary carrier-frame arranged to slide vertically upon said carrier-frame, a scraper supported upon said auxiliary carrier-frame, and a gage-shoe fast to said auxiliary carrier-frame.

18. In an apparatus for removing material from the surface of filter-beds, a carriage arranged to travel over the surface of said filter-beds, a carrier-frame arranged to slide vertically upon said carriage, an auxiliary carrier-frame arranged to slide vertically upon said carrier-frame, a scraper supported upon said auxiliary carrier-frame, a gage-shoe fast to said auxiliary carrier-frame, and means to adjust said shoe vertically with relation to said scraper.

19. In an apparatus for removing material from the surface of filter-beds, a carriage arranged to travel over the surface of said filter-beds, a carrier-frame arranged to slide vertically upon said carriage, an auxiliary carrier-frame arranged to slide vertically upon said carrier-frame, a scraper supported upon said auxiliary carrier-frame, and a gage-shoe pivotally supported upon said auxiliary carrier-frame.

20. In an apparatus for removing material from the surface of filter-beds, a carriage arranged to travel over the surface of said filter-beds, a carrier-frame arranged to slide vertically upon said carriage, an auxiliary carrier-frame arranged to slide vertically upon said carrier-frame, a scraper supported upon said auxiliary carrier-frame, an elevator, and mechanism to operate said elevator supported upon said auxiliary carrier-frame.

21. In an apparatus for removing material from the surface of filter-beds, a carriage arranged to travel over the surface of said filter-beds, a carrier-frame arranged to slide vertically upon said carriage, an auxiliary carrier-frame arranged to slide vertically upon said carrier-frame, a scraper supported upon said auxiliary carrier-frame, an elevator, mechanism to operate said elevator supported upon said auxiliary carrier-frame, a conveyer, and operative mechanism therefor supported upon said carriage.

22. In an apparatus for removing material from the surface of filter-beds, a carriage arranged to travel over the surface of said filter-beds, a carrier-frame arranged to slide vertically upon said carriage, an auxiliary carrier-frame arranged to slide vertically upon said carrier-frame, a scraper supported upon said auxiliary carrier-frame, an elevator, mechanism to operate said elevator supported upon said auxiliary carrier-frame, a conveyer, operative mechanism therefor supported upon said carriage, and means to guide material from said elevator to said conveyer.

23. In an apparatus for removing material from the surface of filter-beds, a carriage arranged to travel over the surface of said filter-beds, a carrier-frame arranged to slide vertically upon said carriage, an auxiliary carrier-frame arranged to slide vertically upon said carrier-frame, and a rotary helical scraper journaled upon said auxiliary carrier-frame.

24. In an apparatus for removing material from the surface of filter-beds, a carriage arranged to travel over the surface of said filter-beds, a carrier-frame arranged to slide vertically upon said carriage, an auxiliary carrier-frame arranged to slide vertically upon said carrier-frame, a rotary helical scraper journaled upon said auxiliary carrier-frame, an elevator provided with buckets, and mechanism to drive said elevator supported upon said auxiliary carrier-frame.

25. In an apparatus for removing material from the surface of filter-beds, a carriage arranged to travel over the surface of said filter-beds, a carrier-frame arranged to slide vertically upon said carriage, an auxiliary carrier-frame arranged to slide vertically upon said carrier-frame, a rotatory shaft journaled upon said auxiliary carrier-frame, right and left hand helical scraper-blades fast to said shaft, and a pulley fast to said shaft between the adjacent ends of said helical scraper-blades.

26. In an apparatus for removing material from the surface of filter-beds, a carriage arranged to travel over the surface of said filter-beds, a carrier-frame arranged to slide vertically upon said carriage, an auxiliary carrier-frame arranged to slide vertically upon said carrier-frame, a rotatory shaft journaled upon said auxiliary carrier-frame, right and left hand helical scraper-blades fast to said shaft, a pulley fast to said shaft between the adjacent ends of said helical scraper-blades, an elevator engaging said pulley, and mechanism supported upon said auxiliary carrier-frame to drive said elevator.

27. In an apparatus for removing material from the surface of filter-beds, a carriage arranged to travel over the surface of said filter-beds, a carrier-frame, mechanism to raise and lower said carrier-frame upon said carriage, an auxiliary carrier-frame arranged to slide vertically upon said carrier-frame, a counterbalance supported upon said carrier-frame connected to said auxiliary carrier-frame, and a scraper supported upon said auxiliary carrier-frame.

28. In an apparatus for removing material from the surface of filter-beds, a carriage, mechanism to move said carriage over the surface of said filter-beds, a carrier-frame, mechanism to raise and lower said carrier-frame upon said carriage, an auxiliary carrier-frame arranged to slide vertically upon said carrier-frame, a rotary helical scraper journaled upon said auxiliary carrier-frame, an elevator, and mechanism to operate said elevator supported upon said auxiliary carrier-frame, together with a conveyer and operative mechanism therefor supported upon said carriage.

29. In an apparatus for removing material from a receptacle, a carriage arranged to travel over said receptacle, a conveyer on said carriage, and an endless elevator on said carriage constructed to carry material from said receptacle to said conveyer.

30. In an apparatus for removing material from a receptacle, a carriage arranged to travel over said receptacle, an endless conveyer upon said carriage, mechanism for moving said conveyer, an endless elevator upon said carriage constructed to carry material from said receptacle to said endless conveyer, and means for conveying the material in said receptacle to said endless elevator.

31. In an apparatus for removing material from the surface of filter-beds, a carriage arranged to travel over the surface of said filter-beds, a conveyer on said carriage, an elevator constructed to carry the material from said filter-beds to said conveyer, and means, governed by the surface of said filter-beds, for regulating the depth of cut of said elevator.

32. In an apparatus for removing material from the surface of filter-beds, a carriage arranged to travel over said filter-beds, a conveyer, mechanism for operating said conveyer, an elevator constructed to carry said material from said filter-beds to said conveyer, and means, governed by the surface of said filter-beds, for regulating the depth of cut of said elevator.

33. In an apparatus for removing material from the surface of filter-beds, a carriage arranged to travel over said filter-beds, a conveyer, mechanism for operating said conveyer, an elevator constructed to carry said material from said filter-beds to said conveyer and mechanism for conveying the material in said filter-beds to said elevator, the depth of cut of said mechanism being regulated by the surface of the filter-beds.

34. In an apparatus for removing material from filter-beds, a carriage arranged to travel over said filter-beds, a conveyer located on said carriage, mechanism to scrape material from said filter-beds, and an endless elevator constructed to carry material from said scraper to said conveyer.

35. In an apparatus for removing material from filter-beds, a carriage arranged to travel over said filter-beds, a conveyer, mechanism to move said conveyer transversely of said carriage, an endless elevator constructed to carry material from said filter-beds to said transverse conveyer.

In testimony whereof I have hereunto set my hand in presence of two subscribing witnesses.

HIRAM W. BLAISDELL.

Witnesses:
E. E. SMITH,
A. J. FLORES.